Oct. 10, 1961  A. SLAYTON ET AL  3,003,189
MOLDING MACHINE

Filed July 14, 1958  6 Sheets-Sheet 1

Fig. 1.

INVENTORS
ALBERT SLAYTON and
GEORGE HOLTON
BY Harold B. Hood
ATTORNEY

Oct. 10, 1961     A. SLAYTON ET AL     3,003,189
MOLDING MACHINE Filed July 14, 1958     6 Sheets-Sheet 4

INVENTOR.
ALBERT SLAYTON and
GEORGE HOLTON

BY Harold B. Hood

ATTORNEY

INVENTOR.
ALBERT SLAYTON and
GEORGE HOLTON
BY
Harold B. Hood
ATTORNEY

United States Patent Office 3,003,189
Patented Oct. 10, 1961

3,003,189
MOLDING MACHINE
Albert Slayton and George Holton, Grass Lake, Mich., assignors to Radio-Television Products Corporation, Grass Lake, Mich., a corporation of Michigan
Filed July 14, 1958, Ser. No. 748,438
15 Claims. (Cl. 18—30)

This invention relates to a novel molding machine and to certain subcombinations thereof, namely, a means for feeding, into the mold of the machine, filament or wire intended to be a part of the molded product, a safety device for protecting the machine in case of a malfunction of ejecting action, and a feeding and metering mechanism for supplying raw material to the molding machine proper for molding.

It is an object of the present invention to provide a novel molding machine.

It is a further object of the present invention to provide an improved machine for producing a molded product which includes a filament or filaments extending from one or both sides of the product.

Another object of the present invention is to provide an improved device for feeding filament or wire.

Still a further object of the present invention is to provide an improved device for feeding and metering pellets of material.

A further object of the present invention is to provide a sensing mechanism for stopping the operation of the machine if a molded product has not been completely removed from the machine.

Another object of the present invention is to provide a molding machine in which a filament feeding means functions also as an ejecting means for removing molded products from the molding machine.

Still another object of the present invention is to provide an automatic molding machine for producing a molded product which includes a wire or wires extending from one or both sides of the product.

Still further objects of the invention will appear as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
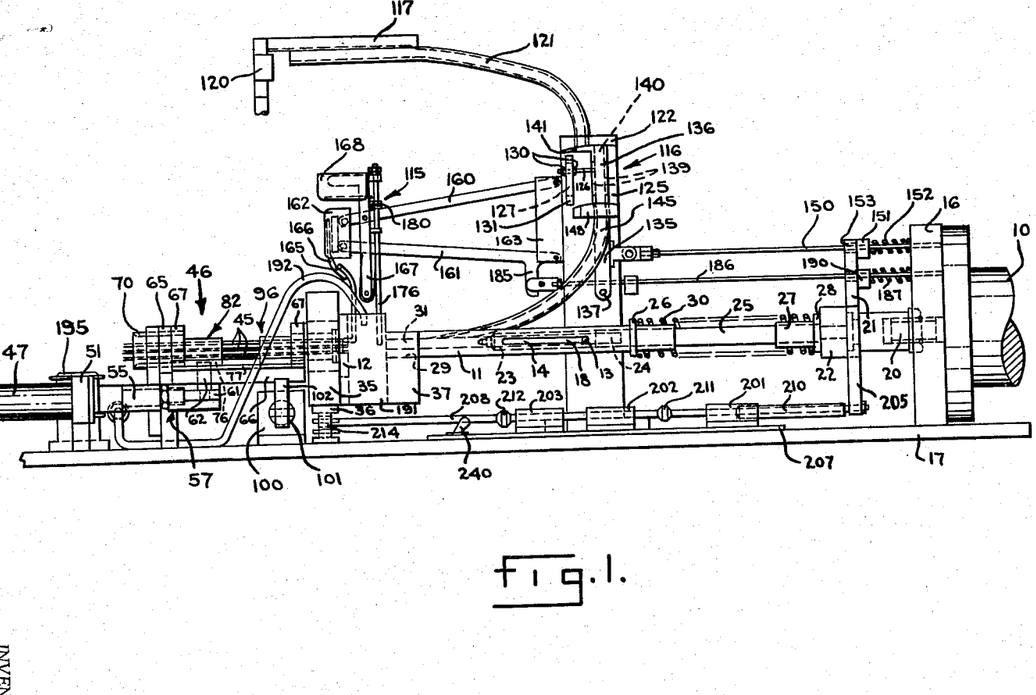
FIG. 1 is a side elevation of a molding machine incorporating the elements of the present invention.
Figure 2:
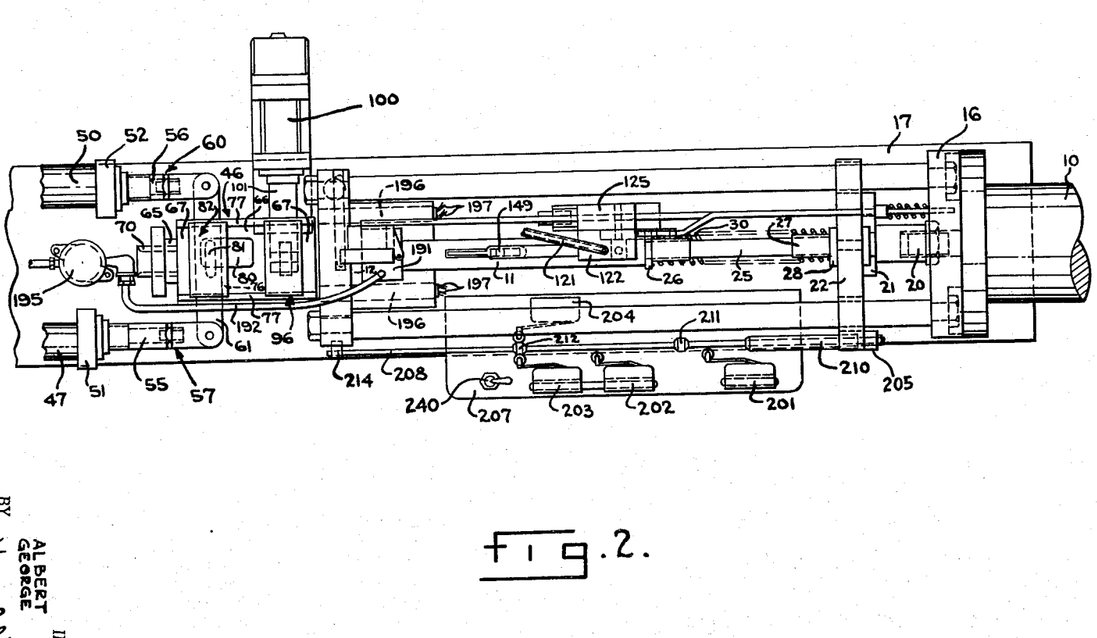
FIG. 2 is a plan view of the molding machine of FIG. 1.

Referring now to the form of our invention illustrated in FIGS. 1–6, it will be seen that we have illustrated our novel molding machine as a machine for forming molded plastic terminal boards and as comprising a fluid motor 10 which may be actuated to force a ram 11 and a force rod 14 leftwardly, as viewed in FIGS. 1 and 2, against a mold 12 so as to mold material in a mold cavity 15 (best shown in FIG. 3) in the mold 12. The fluid motor 10 is fixed to a base 17 by means of an end flange 16 forming a part of the fluid motor 10; and its piston rod 20 is operatively connected to a guide bar 22 mounted to slide on rods 17'—17' fixedly supported from the base 17. A connecting rod 25 is fixed to the guide bar 22 and has the ram 11 slidably received thereon, the ram 11 having a concentric counter-bore 23 for reception of the connecting rod 25. The connecting rod 25 has a concentric bore 24 in its leftward end within which bore the force rod 14 is fixed by means of a stop screw 13 which also functions to limit the movement of the force rod 14 with respect to the ram 11 by engaging either of the opposite ends of a longitudinal slot 18 in the side of the ram 11.

When the molding machine is in the position of FIG. 1, the ram 11 is held leftwardly with relation to the connecting rod 25 and the force rod 14 by means of a compression spring 30 and is positioned with relation to the connecting rod 25 and the force rod 14 by the stop screw 13 engaging the rightward end of the slot 18. The spring 30 is received about the ram 11 and a sleeve 27 fixed to the connecting rod 25 and is received between a collar 26 fixed to the ram 11 and a collar 28 fixed to the connecting rod 25. The leftward portions of the ram 11 are slidably supported within a cradle 29 formed by a portion of a mold support 37 which also, along with a mold base 35, provides fixed support for the mold 12. The mold support 37 is fixed to the mold base 35 which is fixedly supported by legs 36 fixed to the base 17.

When the fluid motor 10 is actuated to move its piston rod 20 leftwardly, the connecting rod 25, the ram 11 and the force rod 14 move leftwardly as a unit until the ram 11 engages the rightward face of the mold 12. As the fluid motor continues to move the connecting rod leftwardly, the spring 30 is compressed and the force rod 14 moves leftwardly within a concentric bore or chamber 31 in the ram 11 while the connecting rod 25 moves leftwardly within the counter bore 23 in the ram 11. When the molding machine is in the position shown in FIG. 1, a charge of molding material will have been deposited within the bore or chamber 31 ahead of the force rod 14 so that when the force rod 14 moves leftwardly with respect to the ram 11, the molding material will be forced into the mold cavity 15. The leftward movement of the force rod 14 will be halted when the stop screw 13 engages the leftward end of the slot 18.

Figure 3:
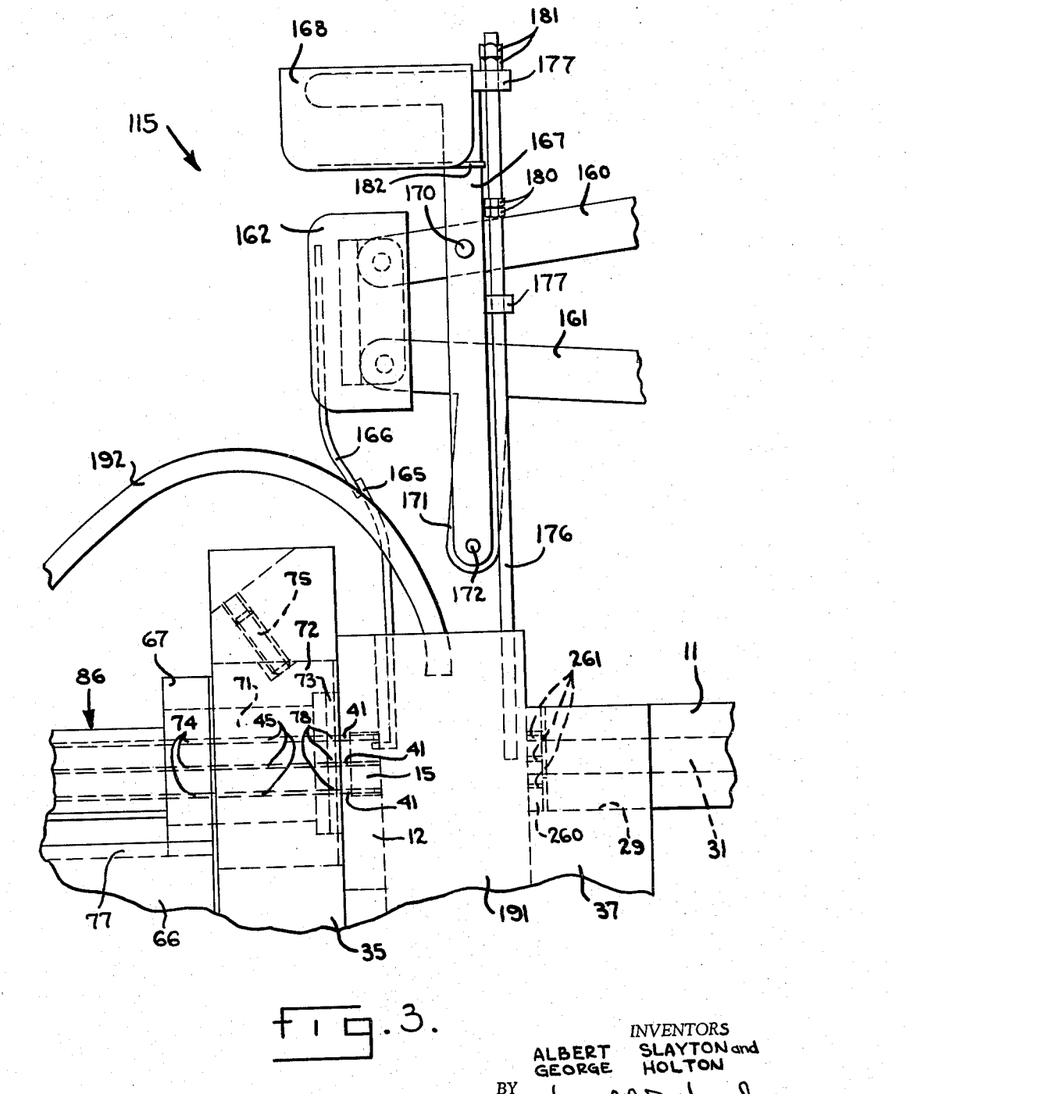
FIG. 3 is an enlarged elevation of a portion of the molding machine showing in detail a sensing device and a mold forming a portion of the machine.
Figure 3A:
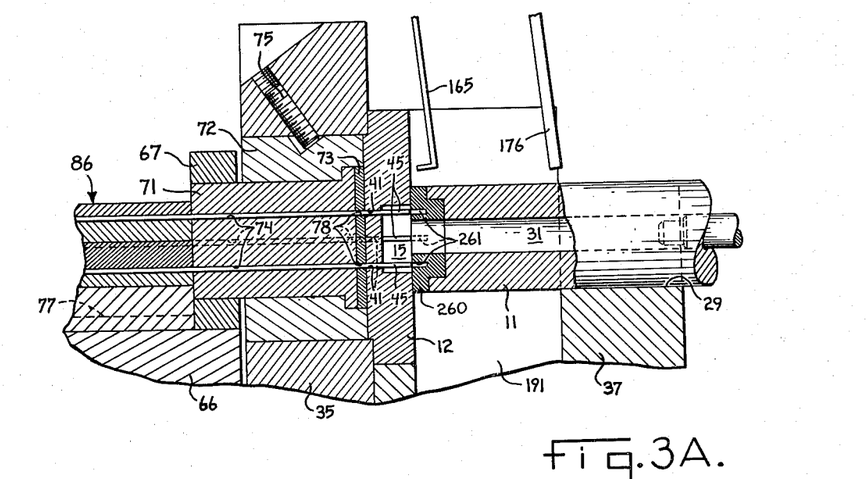
FIG. 3A is a fragmentary, longitudinal sectional view of said mold and showing parts of the structure of FIG. 3 in different operating positions.

A plurality of wires or filaments 45—45 are arranged so as to be moved rightwardly, as viewed in FIGS. 1, 2 and 3, by a wire feed mechanism 46 into the mold cavity 15 where they will be positioned to form a portion of the final molded plastic terminal board. The mold 12 has a plurality of apertures or filament guiding passages 41—41 (FIG. 3) communicating between one face of the mold 12 and the cavity 15, the passages 41 opening into the mold cavity 15 at locations which will produce a desired spacing between each of the plurality of wires 45 in the molded product. If it is desired to change the spacing of the wires in the final molded product or to change the shape of the product, the mold 12 may be replaced by a mold designed to produce the desired result. The wire feed mechanism 46 is arranged, as will be described hereinafter, so as to move a desired number of wires 45 rightwardly at a spacing desired within the final molded product.

The wire feed mechanism 46 comprises a pair of fluid motors 47 and 50 (FIG. 2) which are fixed by their end members 51 and 52 to the base 17. The fluid motors 47 and 50 have piston rods 55 and 56, respectively, which are pivotally connected by conventional connecting means 57 and 60 to a force transmitting member 61. The conventional connecting means 57 and 60 allow for the arc through which the pivotal connection between a particular piston rod and the force transmitting member 61 will travel when one of the fluid motors 47 or 50 is actuated to move its piston rod in either a leftward or rightward direction with respect to the piston rod of the other of the fluid motors 47 or 50. A pin 62 (FIG. 1) is fixed to the force transmitting member 61 so as to extend upwardly therefrom and comprises a portion of the means for moving the wires 45 rightwardly.

A vertical support 65 is fixed to the base 17 and has fixed thereto and extending therethrough a hollow guide 70 for the wires 45 which may be drawn from a plurality of coils (not shown). A wire feed support 66 has a pair of vertical end members 67–67 fixed thereto and extending upwardly from the opposite ends thereof. The wire feed support 66 is pivotally mounted by its leftward end member 67 upon the guide 70 and is fixedly mounted by its rightward end member 67 upon a cylindrical driver 71 (see FIG. 3) which is pivotally mounted within a cylindrical carrier 72 fixed within the mold base 35 by means of a set screw 75.

The cylindrical driver 71 has fixed to its rightward face a cylindrical shear plate 73, the function of which will be explained hereinafter. The driver 71 and the shear plate 73 each have a plurality of passages 74—74 and 78—78, respectively, each of the passages 74 being aligned with a respective one of the passages 78. In the position of the molding machine as shown in FIG. 3 the passages 74 and 78 are in alignment with the passages 41 in the mold 12 so as to allow the wires 45 to be fed into the cavity 15 in the mold 12.

Figure 4:
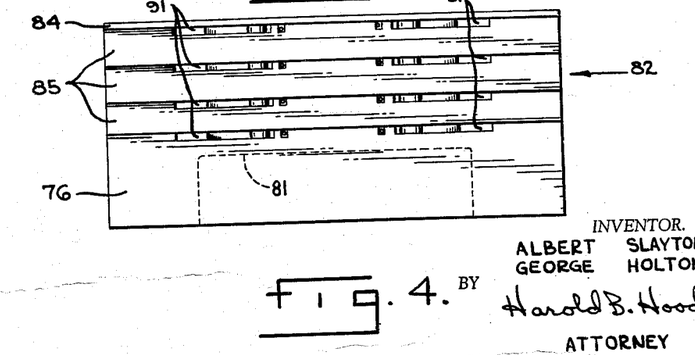
FIG. 4 is an enlarged front view of a stack of bases or plates forming a part of a filament feeding mechanism of the molding machine of FIG. 1.
Figure 5:
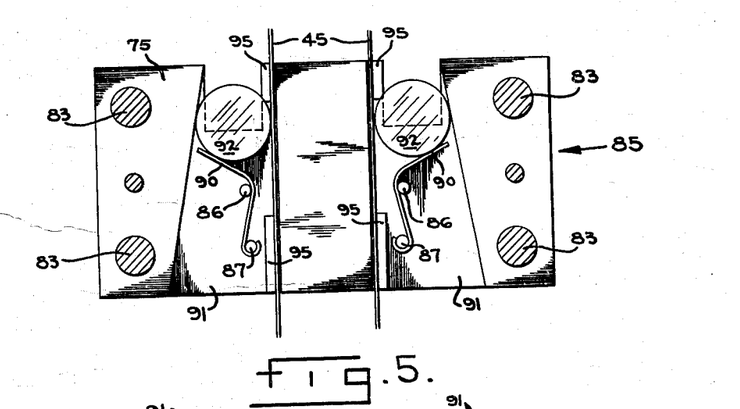
FIG. 5 is an enlarged top view of one of the plates or bases of FIG. 4.

The pin 62 extends upwardly through a rectangular aperture 80 (FIG. 2) in the wire feed support 66 so that it may engage the surfaces of an elongated slot 81 in a bottom plate 76 of a movable stack 82 of plates or bases 85—85 (FIGS. 4 and 5). The movable stack 82 functions when moved rightwardly, as viewed in FIGS. 1 and 2, to grip each of the plurality of wires 45 to move them rightwardly with the movable stack 82. When the movable stack 82 is moved leftwardly, it partially relaxes its grip upon the plurality of wires 45 so as to allow them to remain in the position to which they have been moved and in which they are held by a fixed stack 96 described below. The movable stack 82 may be moved rightwardly or leftwardly by means of either of the fluid motors 47 and 50 acting through the force transmitting member 61 and the pin 62. The movable stack 82 is guided in its leftward and rightward movements by means of upwardly extending flanges 77—77 which form a portion of the wire feed support 66.

The movable stack 82 includes the bottom plate 76, best shown in FIG. 4, a plurality of stacked bases or plates 85, shown in FIG. 4 and one of which is shown in FIG. 5, and a top plate 84 (FIG. 4) all of which are fixed together by suitable screws 83—83. Each of the plates 85 includes a pair of tapered openings or slots 91—91 which have mutually facing, tapering walls and which have elongated ridges 95—95 projecting upwardly from the floor thereof, and which form passageways for the wires 45. Discs or gripper elements 92—92 are held within the tapered depressions 91 by means of springs 90—90 which are mounted upon pins 86—86 and 87—87 fixed to the plates 85 and extending within the tapered depressions 91. The plates 85 are so arranged in the movable stack 82 that the larger ends of the tapered depressions 91 face toward the desired direction of movement of the wires 45. Thus, when the movable stack is moved rightwardly, as viewed in FIG. 1 (downwardly as viewed in FIG. 5), the discs are wedged against the wires 45 by means of the springs 90 and the wires themselves, and therefore the discs grip the wires and move them rightwardly, as viewed in FIGS. 1 and 2.

The fixed stack 96 is fixed to the wire feed support 66 and is constructed in exactly the same manner as the movable stack 82 with the exception that there is no necessity for the elongated slot 81. The fixed stack 96 is arranged so that the smaller ends of the tapered slots or openings thereof face away from the direction of desired movement of the wires 45. Therefore, when the movable stack is moved leftwardly, as viewed in FIGS. 1 and 2, the discs of the fixed stack are wedged within the tapered slots of the fixed stack so as to grip the wires 45 and prevent the wires from being moved reversely by the movable stack 82, the discs 92 rolling toward the larger ends of the depressions 91, during such reverse movement of the stack, against the tendency of the springs 90. Similarly, as the wires move rightwardly with the stack 82, the corresponding discs in the stack 96 move toward the larger ends of their depressions to relax their grips on the wires. The number, pattern and spacing of the wires 45 conveyed by the feed mechanism 46 may be changed by replacing the bases or plates of the fixed and movable stacks with plates or bases of different thickness and having different spacing of the slots or openings therein.

A fluid motor 100 is fixed to the base 17 and has a piston rod 101 which is pivotally secured to a depending member 102 (FIG. 1) fixed to the lower surface of the wire feed support 66. Referring to FIG. 3, the rightward face of the shear plate 73 is adjacent and in slidable contact with the leftward face of the mold 12 so that a pivoting of the shear plate by means of the fluid motor 100 and through the wire feed support 66 and the driver 71 will cause the wires 45 extending through the shear plate passages 78 and the mold passages 41 to be sheared at the adjacent surfaces of the shear plate and mold.

A sensing mechanism, indicated generally by the numeral 115, and a metering mechanism, indicated generally by the numeral 116, are also actuated when the fluid motor 10 is caused to move piston 20 leftwardly from the position of FIG. 1 or rightwardly to the position of FIG. 1. The metering mechanism 116 consists in part of a hopper 117 and a vibrator 120. The vibrator 120 causes cylindrically shaped pellets of moldable material, such as plastic granules which are well known to the art, to be aligned with a trough formed at the bottom of the hopper 117 and causes the pellets to be vibrated along an upper feed or pellet supply tube 121, the lower end of which is fixed in a vertical attitude within a projecting portion 122 of a vertical support member 125 fixed to the base 17. A horizontally projecting metering pin 126 is adjustably fixed by means of nuts 130—130 within an elongated vertically extending slot 127 in a support member 131 fixed to the vertical support member 125.

A pivotal arm 135 is pivotally mounted upon the vertical support member 125 by means of a pin 137 and has fixed thereto an offset block 136 which is generally tubular. Thus the pivotal arm 135 and the offset block 136 together make up a pivotally mounted element having a tubular portion. The offset block 136 has a bore 140 extending therethrough and also has elongated slots 139—139 which extend on the leftward and rightward faces of the offset block 136 in a direction parallel to the elongated slot 127 so that when the arm 135 is pivoted toward the metering pin 126, the slots in the offset block will accommodate the metering pin 126 no matter what the position within which it has been adjustably fixed along the slot 127.

The upper surface of the offset block 136 is formed to a radius, the center of which is at the axis of the pin 137 as is the lower surface of the projecting portion 122, and therefore when the pivotal arm 135 is pivoted to or from the position of FIG. 1 the upper surface of the offset block will always be just adjacent the lower surface of the projecting portion 122. When the pivotal arm 135 is pivoted in a counter-clockwise direction, as viewed in FIG. 1, the offset block 136 will engage the support 131 when the bore 140 is aligned with the lower end of the upper feed tube 121. The offset block 136 has at its upper surface a projection 141 which functions, when the pivotal arm 135 is in a clockwise position, as viewed in FIG. 1, to prevent pellets from dropping out of the upper feed tube 121.

The pivotal arm 135 may be pivoted from the vertical or clockwise position shown in FIG. 1 by means of a compression spring 152 forcing against a collar 151 fixed to the rod 150 when a vertical plate 21, fixed to move with the guide bar 22, has been moved leftwardly by means of the fluid motor 10 from the position of FIG. 1. It will be noted that the rod 150 is slidably received within a bore 153 in the vertical plate 21. The pivotal arm 135 will be returned to the vertical or clockwise position of FIG. 1 by means of the vertical plate 21 forcing rightwardly against the collar 151 when the vertical plate 21 is returned to the position of FIG. 1 by means of the fluid motor 10.

When the pivotal arm 135 is in the leftward or counter-clockwise position, its bore 140 is aligned with the upper feed tube 121 so as to allow pellets to enter the upper end of the bore 140. The number of pellets allowed to enter the bore 140 will be determined by the position of the metering pin 126 in the elongated vertically extending slot 127 or, in other words, its distance below the lower end of the upper feed tube. When the pivotal arm is returned to the vertical position of FIG. 1, the metering pin 126 no longer prevents the downward movement of the pellets in the bore 140 and the lower end of the bore 140 registers with the upper end of a lower feed or pellet delivery tube 145. The upper end of tube 145 is fixed to a keeper 148 carried by member 125, while its lower end is arranged to register, in the illustrated position of the parts, with a port 149 in the upper surface of the ram 11 opening into the chamber 31. Thus, as the arm 135 returns to its illustrated position, a charge of pellets will be discharged from bore 140 through tube 145 to chamber 31.

Referring now to the above-mentioned sensing mechanism 115, rods 160 and 161 are pivotally mounted upon a projecting portion 163 of the vertical support member 125 and have pivotally mounted at their opposite ends an electrical switch 162. The electrical switch 162 has fixed to its downwardly extending arm 166 a probe 165 which, in the position of FIG. 1, extends into the mold cavity 15. If there is still a molded product remaining in the mold cavity 15 when the ram 11 is in its rightward position as shown in FIG. 1, the switch 162 will be actuated by the probe 165 being held rightwardly opening electrical contacts 164—164 (FIG. 6) to prevent further operation of the molding machine in a manner described hereinafter. Normally the electrical contacts 164 are held together by a suitable spring in the switch 162.

A normally vertical rod 167 has fixed thereto a switch 168, is pivotally mounted upon the rod 160 by a pin 170 and is pivotally mounted by pin 172 upon a rod 171 which is fixed to and extending from the rod 161. A probe 176 is reciprocably received within collars 177—177 fixed to the normally vertical rod 167 and is prevented from dropping downwardly out of the collars 177 by means of a pair of stop nuts 181—181. A further pair of nuts 180—180 is adjustably fixed at a position upon the probe 176 so that if there is a molded article adhering to the leftward end of the ram 11, the probe 176 will engage that article to be held upwardly as the switch 168 is moved downwardly causing the nuts 180 to actuate an arm 182 of the switch 168 opening contacts 169—169 (FIG. 6) of the switch to stop further operation of the molding machine in a manner to be described hereinafter.

When the fluid motor 10 is actuated so as to move the ram 11 leftwardly, the sensing mechanism including the probes 165 and 176 will be moved upwardly out of the path of the ram 11 and the force rod 14 by means of a rod 186 which is pivotally secured to an arm 185 integral with the rod 161. A collar 190 is fixed to the rod 186 and will be moved leftwardly with rod 186 by means of a compression spring 187 received about rod 186 when the vertical plate 21 is moved leftwardly by the fluid motor 10. It will be noted that the various pivots of the sensing mechanism 115 are so arranged that the probe 165 will be pivoted rightwardly as well as upwardly when the rod 186 moves leftward so as to free the probe 165 from the mold cavity 15.

Figure 6:
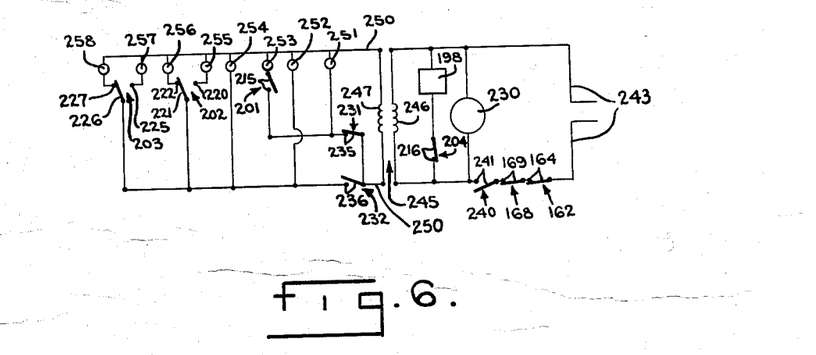
FIG. 6 is a schematic representation of an electrical circuit forming a part of the molding machine.

Referring again to FIG. 3, the mold support 37 is provided with a vertically extending opening 191 the lower end of which opens above a receptacle (not shown) designed to receive molded terminal boards which have been molded in the cavity 15. The finished terminal boards are pushed from the cavity 15 by the feeding of the wires 45 into the cavity through the passages 41. An air tube or hose 192 is arranged to extend into the upper end of the vertical opening 191 and functions to prevent the molded products from sticking to the walls of the opening 191 or jamming the opening 191. The air hose is controlled to direct an air stream into the upper end of the opening by means of an air valve 195 (FIGS. 1 and 2) fixed to the base 17 and operated by a solenoid 198 (FIG. 6).

A pair of electric heaters 196–196 (FIG. 2) are received within suitable cavities in the mold support 37 and in the mold base 35 and function to maintain the mold 12 at a temperature sufficiently high to make possible rapid plastic flow of the charge deposited in the mold cavity by the force rod 14. The heaters 196 have electrical leads 197—197 for supplying electric current thereto.

A plurality of switches 201, 202, 203 and 204 are mounted upon a plate 207 fixed to the base 17 and are arranged to be actuated by a cam rod 208 fixed to a member 205 depending from and fixed to the guide bar 22. The cam rod 208 has a plurality of cams 210, 211 and 212 fixed thereto and is slidably received within a collar 214 fixed to the mold base 35 so as to provide support for the cam rod as it is moved by the guide bar 22 and member 205. The switches 201 and 204 have contacts 215—215 and 216—216, respectively, which are closed when their respective switches are engaged by one of the cams 210 or 212, respectively. The switches 202 and 203 have contacts 220, 221, 222 and 225, 226, 227, respectively. The contact 221 of the switch 202 is held in contact with the contact 220 of the switch 202 when the switch is engaged by the cam 211 and is held in contact with the contact 222 when the switch is not engaged by that cam. The contact 226 of the switch 203 is held in contact with contact 225 when the switch is engaged by the cam 212 and is held in contact with the contact 227 when the switch is not engaged by that cam.

The remainder of the components of the electrical circuit of the molding machine, which in themselves are conventional, will be described in connection with the following description of operation of the machine.

*Operation*

Assuming that an operator desires to use the machine to produce a molded plastic terminal board having terminal wires extending from both sides thereof, the components of the machine should be in the following starting positions. A conventional timer 230 (FIG. 6) which has a switch 231 and a switch 232 associated therewith will be in such a position that contacts 235—235 of the switch 231 are closed and contacts 236—236 of the switch 232 are open. Switch 201 will not be engaged by any cam and therefore its contacts 215—215 will be open.

Switch 202 will not be engaged by a cam and its contact 221 will be engaging its contact 222. Switch 203 will be engaged by the cam 212 and therefore its contact 226 will be engaging its contact 225. Switch 204 will be engaged by the cam 212 and therefore its contacts 216 will be closed. Switches 162 and 168 associated with the sensing mechanism 115 will have their contacts 164 and 169 both closed in view of the fact that molded products will be cleared from the cavity 15 and the leftward face of the ram 11.

A manually operated switch 240 for turning the machine on or off will have its contacts 241—241 open. The fluid motor 10 will have its piston rod 20 in the retracted position of FIG. 1 as will be fluid motors 50 and 100 have their respective piston rods in the retracted positions shown in FIGS. 1 and 2. The fluid motor 47 will have its piston rod 55 in an extended or advanced position as shown in FIGS. 1 and 2. The timer 230 will be stopped and the solenoid 198 will be in such a position that its associated air valve 195 will be closed so as to prevent passage of air under pressure through the air hose 192. The vibrator 120 will be operating so as to fill the upper pellet conveying tube 121 with pellets from the hopper 117. Inasmuch as the fluid motor 10 is in its retracted position as shown in FIG. 1, the pivotal arm 135 and offset block 136 will be in the clockwise position of FIG. 1.

The chamber 31 will have a charge of pellets therein which will have been previously metered by the metering mechanism 116 and have passed into the chamber 31 through the lower pellet conveying tube 145. The sensing mechanism 115 will be down as shown in FIGS. 1 and 3. The mold 12 will be in a heated condition and maintained in such a condition by the heaters 196. The wires 45 will be extending into the cavity 15 to a position flush with the rightward face of the mold 12.

To start the operation of the molding machine, the operator throws the manually operated switch 240 to a closed position closing the contacts 241 and causing a voltage drop, already present across lines 243—243, to be placed across the timer 230 and a primary winding 246 of a step down transformer 245 through the closed contacts 164, 169 and 241 of the switches 162, 168 and 240, respectively. The step down transformer 245 is not necessarily, a part of the electrical circuit but is used in this particular embodiment to provide a lower electrical voltage to certain components of the electrical system which are constructed to operate on a lower voltage. Closing the switch 240 also causes energization of the solenoid 198 of the air valve 195 through the closed contacts 164, 169, 241 and 216 of the switches 162, 168, 240 and 204, respectively, causing the air hose 192 to release a blast of air into the vertically extending opening 191 which, however, has no effect at this time inasmuch as the cavity 15, ram face, and opening 191 have been cleared of molded products.

The voltage drop across the timer 230 activates a timer motor associated therewith to begin a timing cycle. The voltage drop across the primary 246 of the transformer 245 causes the transformer to create a voltage drop across its secondary winding 247 resulting in a voltage drop across lines 250—250. The voltage drop across the lines 250—250 causes a solenoid 251 associated with an advance valve (not shown) for the fluid motor 10 to be energized. The advance valve of the fluid motor 10 is arranged to cause admission of fluid under presure to the fluid motor 10, when its solenoid 251 is energized, in such a manner as to extend the piston rod 20 of the fluid motor 10.

As the piston rod 20 extends it moves the vertical plate 21, the guide bar 22, the connecting rod 25, the ram 11 and the force rod 14 leftwardly as a unit. As the vertical plate 21 moves leftwardly, the rods 150 and 186 are moved leftwardly by the springs 152 and 187 forcing against the collars 151 and 190 fixed to the rods 150 and 186 resulting in the pivotal arm 135 being pivoted counter-clockwise, as viewed in FIG. 1, and in the rods 160 and 161 being pivoted clockwise, as viewed in FIG. 1. Referring to FIG. 1, it can be seen that the rod 160 is at a slight downward angle from its pivotal mount while the rod 161 is at a slight upward angle. Therefore as the rod 186 begins to pivot the rods 161 and 160 upwardly, the pivotal connection of the rod 161 with the switch 162 will move slightly rightwardly at the same time the pivotal connection of the rod 160 with the switch 162 moves leftwardly, resulting in the probe 165 being pivoted counter-clockwise, as viewed in FIG. 3, out of the cavity 15 as it is moved upwardly in the vertical opening 191. By the movement of the rod 186 the probes 165 and 176 are moved upwardly out of the path of the advancing ram 11.

The counter-clockwise pivoting of the pivotal arm 135 moves the offset block 136 fixed thereto to a position in which the bore 140 is aligned with the lower end of the upper pellet conveying tube 121 and the metering pin 126 is extending through the elongated vertically extending slots 139 so as to stop the passage of pellets through the bore 140. Some of the pellets in the upper pellet conveying tube 121 move downwardly into the portion of the bore 140 above the metering pin 126. The pellets so contained in the bore 140 above the metering pin will make up the next charge to be fed to the bore or chamber 31.

As the guide bar 22 moves out of the position of FIG. 1, it moves the cam rod 208 leftwardly causing the cam 212 to disengage the switches 203 and 204, opening the contacts 216 and the contacts 225 and 226 and closing the contacts 226 and 227. The opening of the contacts 216 deenergizes the solenoid 198 associated with the air valve 195 causing the air valve to close and stop the passage of air under pressure through the air hose 192. The opening of the contacts 225 and 226 and the closing of the contacts 226 and 227 has no effect at this time because the contacts 236 of the timer switch 232 are open.

As the ram 11 is moved leftwardly by the piston 20, the cam rod 208 is also moved in such a manner that the cam 211 engages and then releases the switch 202 causing the contacts 221 and 222 to be broken, the contacts 221 and 220 to be closed and then rapidly broken, and the contacts 221 and 222 to again be closed. Because the contacts 236 of the switch 232 are open, such actuation of the switch 202 has no effect upon the operation of the machine.

The ram 11 continues to move leftwardly until the ram engages the face of the mold 12 overlapping and closing off the cavity 15 with the chamber 31 in registry with the cavity 15. The cam 210 is so located on the cam rod 208 that, at the time of contact of the ram 11 with the mold face, the cam 210 actuates the switch 201 to close its contacts 215. Referring to FIG. 3 it will be noted that the ram 11 has a head 260 with apertures or sockets 261—261 therein and extending axially of the ram 11. As was stated above, the wires 45 are extending into the cavity 15 to a position flush with the rightward surface of the mold. The closing of the contacts 215 causes a solenoid 253 associated with an advance valve (not shown) for the fluid motor 50 to be energized through the closed contacts 235 and 215. The advance valve of the fluid motor 50 is arranged to cause admission of fluid under pressure to the fluid motor 50, when the solenoid 253 is energized, in such a manner as to extend the piston rod 56 of the fluid motor 50.

The piston rod 56 moves the force transmitting member 61 and the pin 62 causing the movable stack 82 to be moved rightwardly, as viewed in FIG. 1, moving the wires 45 rightwardly and moving their ends into the apertures 261 in the head of the ram. The particular embodiment of the invention herein disclosed is intended for manufacture of terminal boards having wires extending from both sides thereof and therefore the above described operation of the fluid motor 50 is necessary to place the wires 45 in a position extending rightwardly beyond the leftward face of the ram which face will determine one boundary of the final molded terminal board. However, if it is desired to produce a terminal board having wires extending from only one surface thereof, the feed step of the fluid motor 50 may be eliminated as may be the apertures 261 in the head 260 of the ram 11.

It will be noted that the piston rods 55 and 56 of the fluid motors 47 and 50 are now both extended so as to position the movable stack 82 in a far rightward position. The fluid motor 10 continues to advance causing the vertical plate 21, the guide bar 22, the cam rod 208, the connecting rod 25 and the force rod 14 to continue to move leftwardly. Because the ram 11 has engaged the mold 12, it remains stationary and the compression spring 30 is compressed resulting in the force rod 14 moving, with relation to the ram, through the chamber 31 pushing the pellets therein into the mold cavity. The pellets are crushed by the leading end of the force rod, and the heat of the mold produced by the heaters 196 causes the crushed material to become plastic and to flow around the wires, filling the cavity.

The timer 230 is so designed that it opens its switch 231 breaking the contacts 235 when the leftward movement of the force rod 14 has been completed. The breaking of the contacts 235 has no effect at that time because it merely deenergizes the solenoids 251 and 253, associated with the advance valves of the fluid motors 10 and 50. These valves will continue to direct fluid under pressure to their respective fluid motors so as to cause the fluid motor 10 to continue to extend its piston and to cause the fluid motor 50 to maintain its piston extended until solenoids associated with retract valves for the fluid motors are energized. The leftward movement of the piston 20 of the fluid motor 10 will be limited by the stop screw 13 engaging the leftward end of the slot 18 in the ram 11.

After the force rod has reached its far leftward position all of the components of the machine remain stationary while the molding is taking place with the exception of the timer 230 which, however, actuates no switches until a desired time length of molding is completed. At the end of the molding period the timer 230 closes the switch 232 closing its contacts 236 so as to energize solenoids 252 and 254 from the lines 250 and so as to energize solenoids 256 and 258 from the lines 250 and through contacts 221 and 222 and contacts 226 and 227, respectively, and through the contacts 236. The solenoids 252, 254, 256 and 258 are associated with retracting valves (not shown) for the fluid motors 10, 50, 100 and 47, respectively, and when these solenoids are energized they cause admission of fluid under pressure to the various fluid motors so as to retract their respective pistons. Thus the pistons of all the fluid motors are caused to retract with the exception of piston 101 of fluid motor 100 which is already retracted.

Even though the fluid motor 10 is retracting its piston rod 20 and the various components fixedly connected thereto, the ram 11 is not retracted until the stop screw 13 engages the rightward end of the slot 18 at which time the ram also moves rightwardly away from the rightward surface of the mold 12. As the ram 11 moves away from the mold face, the cam 210 disengages the switch 201 allowing the contacts 215 to open. The opening of the contacts 215 has no effect at this time inasmuch as the solenoid 253 has already been deenergized by the opening of contacts 235 of the timer switch 231.

The cam 211 is so located on the cam rod 208 that, when the ram clears the ends of the wires 45, the switch 202 is engaged by the cam 211. Because of the design (shortness) of the cam and the fact that the cam rod 208 continues to move with the fluid motor 10, this engagement is only instantaneous resulting in the contacts 221 and 222 being broken, the contacts 221 and 220 being closed, then rapidly broken, and the contacts 221 and 222 again being closed. A solenoid 255 associated with an advance valve (not shown) for the fluid motor 100 is energized by the closing of the contacts 220 and 221 causing admission of fluid under pressure to the fluid motor 100 in such a manner as to extend the piston 101.

The stroke of the piston 101 is such as to pivot the various components to which it is attached by the depending member 102 through an angle which we presently believe should preferably be about 15 degrees. Thus the shear plate 73 is pivoted with respect to the mold 12 causing a shearing of the wires 45 at the slidably contacting rightward surface of the shear plate 73 and leftward surface of the mold 12. The rapid return of the contact 221 from the contact 220 to the contact 222 deenergizes the solenoid 255 associated with the advance valve of the fluid motor and energizes the solenoid 256 associated with the retract valve (not shown) of the fluid motor, thus causing the piston 101 of the fluid motor 100 to be returned to its previous retracted position and causing the passages 74 and 78 to be realigned with the passages 41 in the mold 12, whereby wire can again be fed through those passages.

As the piston 20 of the fluid motor 10 nears the end of its retracting stroke the vertical plate 21 engages the collars 151 and 190 fixed to the rods 150 and 186 pivoting the pivotal arm 135 and offset block 136 clockwise and pivoting the probes 165 and 176 of the sensing mechanism 115 downwardly into the vertical opening 191. The feeding and metering mechanism 116 and the sensing mechanism 115 do not return completely to the positions of FIGS. 1 and 3 until the piston rod 20 of the fluid motor 10 reaches the full limit of its return stroke.

Just before the piston rod 20 reaches the limit of its stroke, the cam 212 engages the switches 204 and 203 closing the contacts 216 and the contacts 225 and 226, energizing the solenoid 198 to actuate the air valve 195 to produce an air blast from the hose 192 into the vertical opening 191 for aiding in ejecting the molded product, and energizing a solenoid 257 of an advance valve (not shown) associated with the fluid motor 47 causing admission of fluid under pressure to the fluid motor 47 in such a manner as to extend the piston rod 55 of the fluid motor 47. The extension of the piston rod 55 causes wire to be fed by the wire feed mechanism 46 past the rightward surface of the shear plate 73 through the passages 41 and into the cavity 15 to points substantially flush with the rightward face of the mold 12, forcing the molded product from the mold cavity 15. The air blast from the hose 192 aids in causing the molded product to drop into the receptacle (not shown) below the vertically extending opening 191.

When the piston rod 20 reaches the limit of its stroke, the offset block 136 will have cleared the metering pin 126 so that the charge of pellets in the bore 140 above the pin 126 will be free to pass downwardly through the lower pellet conveying tube 145 and through the port 149 into the chamber 31 to be used in the next molding cycle.

Also the probes 165 and 176 associated with the sensing mechanism 115 will be returned to the position best depicted in FIG. 3. However, if the molded product has not been removed from either the cavity 15 or the face of the ram 11, the probes 165 or 176 will actuate the switches 162 or 168 to break their contacts 164 or 169 to stop or deenergize all of the electrical components shown in FIG. 6 and to prevent further operation of the molding machine. An operator, desiring to clear the cavity 15 or the face of the ram 11 should first throw the switch 240 to break the contacts 241 so that the machine will not begin to operate while he is working on it.

Assuming that the machine operates correctly and the operator does not have to clear the molded product therefrom, the piston rod 20 will remain retracted only long enough for the timer 230 to open the contacts 236 of the switch 232 and to close the contacts 235 of the switch 231 at which time the above described cycle will be automatically repeated.

Figure 7:
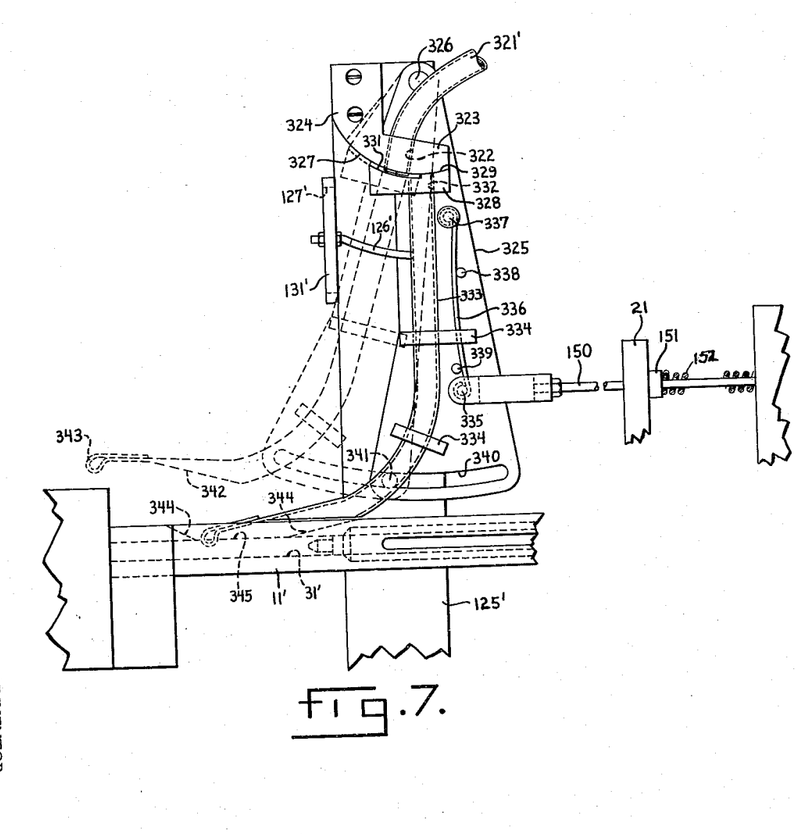
FIG. 7 is an enlarged, broken elevation showing a modified form of pellet feeding means.
Figure 8:
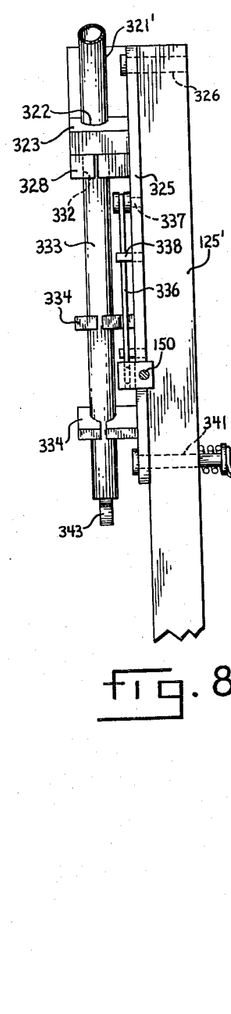
FIG. 8 is an elevation taken from the righthand side of FIG. 7.
Figure 9:
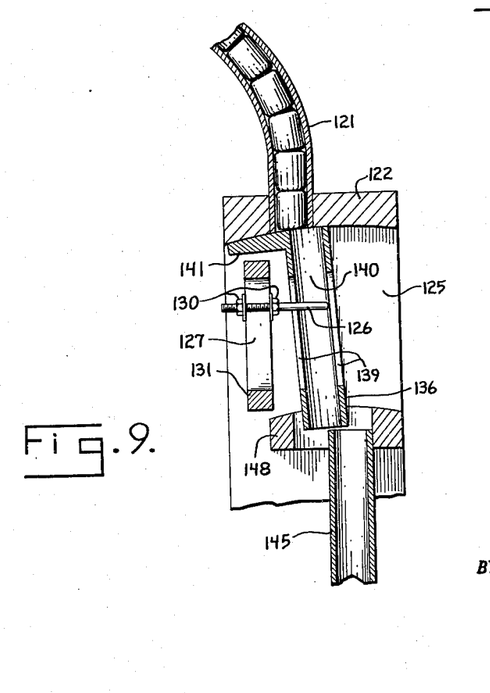
FIG. 9 is an enlarged, fragmentary sectional view through the metering mechanism of FIG. 1.

While the probes and sensing means above described are highly desirable in some applications of the present machine, there are other circumstances in which they are not needed; and while the pellet-feeding means above described operates quite satisfactorily in some environments, the feeding means of FIGS. 7 and 8 constitutes, for some purposes and in some environments, an improvement thereover.

In those figures, the support 125' is the substantial equivalent of the support 125 of FIGS. 1 to 6; and the pellet supply tube 321' is the substantial equivalent of the tube 121.

The lower end of the tube 321' is fixedly secured in a port or bore 322 through a generally horizontal portion 323 of a bracket 324 fixed to the support 125' near the upper end thereof. A carrier 325 is pivotally mounted, as at 326, upon the support 125' between said support and the bracket 324, said carrier being free to swing about the pivot 326. The lower, substantially horizontal surface 327 of the bracket end 323 lies in an arc concentric with the carrier axis 326, and preferably, the lower, open end of the tube 321' projects slightly beyond said surface 327, as shown.

Fixed to, or integral with, the carrier 325 is a block 328 whose upper, substantially horizontal surface comprises a portion 329 which substantially engages the surface 327 and a portion 331 which is spaced slightly below the surface 327, both of said portions being concentric with the carrier axis 326. A bore or opening 332 extends through the block 328 and opens partially through the surface 329 and partially through the surface 331; and the upper end of a pellet delivery tube 333 is fixed in said bore 332. The parts are so proportioned and designed that, when the carrier 325 is in its solid line position, the upper end of the tube 333 is out of registry with the lower end of the tube 321'; and when the carrier is in its broken line position, said tube ends are in registry.

The delivery tube 333 is bodily fixed to move with the carrier 325, for instance, by the straps 334, 334. The rod 150, which is identical with the rod 150 of FIGS. 1 to 6 and carries an identical collar 151 against which bears the spring 152 and with which the plate 21 is engageable, is pivotally connected, as at 335, to the lower end of a spring leaf 336 whose upper end is secured to a pin 337 projecting from carrier 325. The spring leaf 336 is preferably flexed against a pair of stationary pins 338 and 339 projecting from the carrier 325. The arrangement is such that the rod 150 is substantially immovable leftwardly relative to the carrier 325, but is yieldably moveable rightwardly with respect thereto.

A pin 341 is fixedly carried by the support 125' and extends through an arcuate slot 340 in the lower end of the carrier 325 to limit counter-clockwise movement of said carrier. The lower, open end 342 of the tube 333 is so proportioned and designed that, when the carrier 325 is in its solid line position, said tube end is substantially parallel with, and barely clears, the upper surface of the ram 11'. The ram 11' is identical in all respects with the ram 11, except that the port 345 which gives access to the charge-receiving chamber 31' is bounded forwardly and rearwardly by inclined ramps 344—344. A finger 343 projects from the tube end and, in the solid line position of the parts, enters the chamber 31' to guard against accidental movement of pellets, delivered to the chamber, toward the open end of the chamber.

The operation of the feed mechanism of FIGS. 6 and 7 is similar to that described above. When the piston rod 20 moves toward the left as viewed in FIG. 1, it carries with it the plate 21, whereby the spring 152 is permitted to move the rod 150 correspondingly toward the left. Such movement of the rod 150 shifts the carrier 325 from its solid line position to its broken line position, whereby the upper end of the delivery tube 333 is moved into registry with the lower end of the supply tube 321'. Like the tube 145, the tube 333 is formed with an elongated port in its lateral wall facing the bracket 131' in which the stop finger 126' is adjustably mounted in the vertically elongated slot 127'. As the carrier moves in a clockwise direction, the stop finger 126' enters the tube 333 to restrain pellet movement therepast; and a predetermined number of pellets will drop from the tube 321' into the tube 333. Clockwise movement of the carrier is, of course, limited by engagement of the pin 341 with the right-hand end of the slot 340; and the piston rod 20 can continue its leftward movement as the plate 21 slides along the rod 150.

Upon return of the piston rod 20 to its starting position, the plate 21 will engage the collar 151 to entrain the rod 150 in its righthand movement, whereby the carrier 325 will be returned from its broken line position to its solid line position. Thereby, the stop pin 126' is withdrawn from the tube 333, and the pellets which have been deposited therein will slide downwardly through the tube 333 to be discharged, through the port 345, into the chamber 31.

In all other respects, the operation of the machine will be as described above.

We claim as our invention:

1. A molding machine comprising a mold having a mold cavity opening upon an outer surface of said mold, a ram having a charge-receiving chamber opening upon a face of said ram, means for moving said ram into and out of a position wherein said face is against said mold surface and the opening of said chamber is in registry with said mold cavity, said face being proportioned to overlap said mold cavity when in said position, a force rod reciprocably received in said chamber, said moving means also acting to move said force rod, when said ram is in said position, with relation to said ram and toward said mold cavity for forcing a charge from said chamber into said mold cavity to produce a molded product in said mold cavity, a first probe, a second probe, means carrying said first and second probes, said moving means being operable, when moving said ram out of said position, to actuate said carrying means to move said first probe into said cavity and said second probe toward said ram face, means, actuated by said first probe when said first probe encounters a molded product in said cavity, for preventing operation of said moving means, and means, actuated by engagement of said second probe with a molded product adhering to the face of said ram, for preventing operation of said moving means.

2. A molding machine comprising a mold having a mold cavity opening upon an outer surface of said mold, a ram having a charge-receiving chamber opening upon an end face of said ram and having a port opening from another face of said ram to said chamber, a force rod reciprocably received in said chamber, means for moving said force rod toward said mold cavity to a first position adjacent said mold cavity for forcing a charge from said chamber into said mold cavity, said moving means also acting to move said force rod away from said mold cavity to a second position removed from said mold cavity, spring means connecting said ram and said force rod for causing said ram to move with said force rod toward said mold until said ram end face engages said mold surface in an overlapping relationship to said mold cavity, a pellet conveying tube having a lower end fixed in a generally vertical attitude, a pivotally mounted element having a tubular portion, said tubular portion having an opening in the wall thereof, a fixed stop projecting generally horizontally below said tube end at a spaced distance therefrom, said pivotally mounted element being pivotal between a first location in which said tubular portion is generally vertical and is aligned with and adjacent to said lower end of said tube and said stop is projecting through said opening and into the interior of said tubular portion for stopping the passage of pellets through said tubular portion and a second location in which said tubular portion is generally vertical and said stop is no longer projecting through said opening for allowing pellets in said tubular portion to pass downwardly therethrough for conduction to said ram port, a rod operatively connected with said pivotally mounted element, a collar fixed to said rod, and spring means engaging said collar for yieldably urging said pivotally mounted element into said first location, said force rod moving means also being arranged to engage said collar to move said pivotally mounted element into said second location when said force rod moving means is moving said force rod to said second position.

3. A molding machine comprising a mold having a mold cavity opening upon an outer surface of said mold, a ram having a charge-receiving chamber opening upon a face of said ram, means for moving said ram into and out of a position wherein said face is against said mold surface and the opening of said chamber is in registry with said mold cavity, said face being proportioned to overlap said mold cavity when in said position, a force rod reciprocably received in said chamber, said moving means also being connected to move said force rod, when said ram is in said position, with relation to said ram and toward said mold cavity for forcing a charge from said chamber into said mold cavity to produce a molded product in said mold cavity, a first probe, a second probe, means carrying said first and second probes, said moving means being operable, when moving said ram out of said position, to actuate said carrying means to move said first probe into said cavity and said second probe toward said ram face, means, actuated by said first probe when said first probe encounters a molded product in said cavity, for preventing operation of said moving means, means, actuated by engagement of said second probe with a molded product adhering to the face of said ram, for preventing operation of said moving means, a pellet conveying tube having a lower end arranged generally vertically, a tubular member, means for moving said tubular member into a location below and in registry with said tube while maintaining said tubular member in a generally vertical attitude, a fixed stop extending generally horizontally below said tube end at a spaced distance therefrom for stopping the passage of pellets through said tubular member when said tubular member is in said location, and a second, downwardly-extending pellet conveying tube arranged to establish communication between the lower end of said tubular member and said chamber, said ram moving means being operatively associated with said tubular member to move said tubular member out of said location when moving said ram out of said position for allowing pellets to pass downwardly in said tubular member and said second pellet conveying tube and into said chamber.

4. A molding machine comprising a mold having two oppositely facing outer surfaces, said mold having a mold cavity opening upon one outer surface of said mold, a filament guiding passage in said mold communicating between said cavity and the other outer surface of said mold, a ram having a ram face and having a charge-receiving chamber in said ram opening upon said ram face, a force rod reciprocably received in said chamber, means for moving said force rod toward said mold cavity to a first position adjacent said mold cavity for forcing a charge from said chamber into said mold cavity, said force rod moving means also acting to move said force rod away from said mold cavity to a second position removed from said mold cavity, spring means connecting said ram and said force rod for causing said ram to move with said force rod toward said mold until said ram face engages said one outer surface of said mold in an overlapping relationship to said mold cavity, a movable base having a slot therein which has mutually facing tapering walls, a gripper element received in said slot, spring means carried by said movable base and yieldably urging said gripper element into a wedging relationship with the tapering walls of said slot, a fixed base having a slot therein which has mutually facing, tapering walls, the slot of said fixed base being aligned longitudinally with the slot of said movable base, the walls of said fixed base tapering in the same direction as the walls of said movable base, a gripper element received in said fixed base slot, spring means carried by said fixed base and yieldably urging the gripper element of said fixed base into a wedging relationship with the walls of said fixed base slot, means for moving said movable base in opposite directions which are generally parallel to the lengths of said slots, said slots being aligned longitudinally with said passage in said mold so as to provide a substantially straight path for a filament, and control means for actuating said base moving means to move said movable base in one of said opposite directions for moving a filament, gripped between the walls of said slots and said gripper elements, through said passage into said mold cavity, and for then actuating said force rod moving means to move said force rod to said first position.

5. A molding machine comprising a mold having two oppositely facing outer surfaces, said mold having a mold cavity opening upon one outer surface of said mold, a filament guiding passage in said mold communicating between said cavity and the other outer surface of said mold, a shear plate adjacent the other outer surface of said mold and having a filament guiding passage therethrough normally in registry with said first mentioned passage, means for moving and returning said shear plate with relation to said mold and in a plane parallel with the other outer surface of said mold for shearing a filament extending through said passages, means for feeding a filament through said passages into said mold cavity, means for injecting a charge into said cavity, and control means for actuating said injecting means, for actuating said means for moving and returning said shear plate, and for thereafter actuating said filament feeding means to feed a filament into said cavity and thereby eject a molded product from said cavity.

6. A molding machine comprising a mold having two oppositely facing outer surfaces, said mold having a mold cavity opening upon one outer surface of said mold, a filament guiding passage in said mold communicating between said cavity and the other outer surface of said mold, a shear plate adjacent the other outer surface of said mold and having a filament guiding passage therethrough normally in registry with said first mentioned passage, means for moving and returning said shear plate with relation to said mold and in a plane parallel to the other outer surface of said mold for shearing, adjacent the other outer surface of said mold, a filament extending through said passages, means for feeding a filament through said passages into said cavity, a ram having a ram face and having a charge-receiving chamber in said ram opening upon said ram face, a force rod reciprocably received in said chamber, means for moving said force rod toward said mold cavity to a first position adjacent said mold cavity for forcing a charge from said chamber into said mold cavity, said force rod moving means also acting to move said force rod away from said mold cavity to a second position removed from said mold cavity, spring means connecting said ram and said force rod for causing said ram to move with said force rod toward said mold until said ram face engages said one mold surface in registry with said mold cavity, said ram face being proportioned to overlap said mold cavity, and control means for actuating said filament feeding means to feed filament into said cavity, for actuating said force rod moving means to force a charge into said mold cavity, for actuating said force rod moving means to move said force rod away from said mold cavity, for actuating said shear plate moving means to shear the filament and for actuating said filament feeding means thereafter to feed filament into said cavity and thus remove the molded product from said mold cavity.

7. A molding machine comprising a mold having two oppositely facing outer surfaces, said mold having a mold cavity opening upon one outer surface of said mold, a filament guiding passage in said mold communicating between said cavity and the other outer surface of said mold, a shear plate adjacent the other outer surface of said mold and having a filament guiding passage therethrough normally in registry with said first mentioned passage, means for moving and returning said shear plate with relation to said mold and in a plane parallel to the other outer surface of said mold for shearing, adjacent the other outer surface of said mold, a filament extending through said passages, a movable base having a slot therein which has mutually facing, tapering walls, a gripper element received in said slot, spring means carried by said movable base and yieldably urging said gripper element into a wedging relationship with the tapering walls of said slot, a fixed base having a slot therein which has mutually facing, tapering walls, the slot of said fixed base being aligned longitudinally with the slot of said movable base, the walls of said fixed base tapering in the same direction as the walls of said movable base, a gripper element received in said fixed base slot, spring means carried by said fixed base and yieldably urging the gripper element of said fixed base into a wedging relationship with the walls of said fixed base slot, means for moving said movable base in opposite directions which are generally parallel to the lengths of said slots, said slots being aligned longitudinally with said passage in said mold, so as to provide a straight path for a filament, a ram having a ram face and having a charge-receiving chamber in said ram opening upon said ram face, a force rod reciprocably received in said chamber, means for moving said force rod toward said mold cavity to a first position adjacent said mold cavity for forcing a charge from said chamber into said mold cavity, said force rod moving means also acting to move said force rod away from said mold cavity to a second position removed from said mold cavity, spring means connecting said ram and said force rod for causing said ram to move with said force rod toward said mold until said ram face engages said one mold surface in registry with said mold cavity, said ram face being proportioned to overlap said mold cavity, and control means for actuating said movable base moving means to move said movable base toward said mold to feed filament into said cavity, for actuating said force rod moving means to force a charge into said mold cavity, for actuating said force rod moving means to move said force rod away from said mold cavity, for actuating said shear plate moving means to shear the filament and for actuating said movable base moving means thereafter to move said movable base toward said mold to feed filament into said cavity and thus remove the molded product from said mold cavity.

8. A molding machine comprising a mold having two oppositely facing outer surfaces, said mold having a mold cavity opening upon one outer surface of said mold, a filament guiding passage in said mold communicating between said cavity and the other outer surface of said mold, a shear plate adjacent the other outer surface of said mold and having a filament guiding passage therethrough normally in registry with said first mentioned passage, means for moving and returning said shear plate with relation to said mold and in a plane parallel to the other outer surface of said mold for shearing, adjacent the other outer surface of said mold, a filament extending through said passages, a movable base having a slot therein which has mutually facing, tapering walls, a gripper element received in said slot, spring means carried by said movable base and yieldably urging said gripper element into a wedging relationship with the tapering walls of said slot, a fixed base having a slot therein which has mutually facing, tapering walls, the slot of said fixed base being aligned longitudinally with the slot of said movable base, the walls of said fixed base tapering in the same direction as the walls of said movable base, a gripper element received in said fixed base slot, spring means carried by said fixed base and yieldably urging the gripper element of said fixed base into a wedging relationship with the walls of said fixed base slot, means for moving said movable base in opposite directions which are generally parallel to the lengths of said slots, said slots being aligned longitudinally with said passage in said mold so as to provide a straight path for a filament, a ram having a ram face and having a charge-receiving chamber in said ram opening upon said ram face, a force rod reciprocably received in said chamber, means for moving said force rod toward said mold cavity to a first position adjacent said mold cavity for forcing a charge from said chamber into said mold cavity, said force rod moving means also acting to move said force rod away from said mold cavity to a second position removed from said mold cavity, spring means connecting said ram and said force rod for causing said ram to move with said force rod toward said mold until said ram face engages said one mold surface in registry with said mold cavity, said ram face being proportioned to overlap said mold cavity, a first probe, a second probe, means carrying said first and second probes, said force rod moving means being operable, when moving said force rod to said second position, to actuate said carrying means to move said first probe into said cavity and said second probe toward said ram face, means, actuated by said first probe when said first probe encounters a molded product in said mold cavity, for preventing operation of said force rod moving means, and means, actuated by engagement of said second probe with a molded product adhering to the face of said ram, for preventing operation of said force rod moving means, and control means for actuating said movable base moving means to move said movable base toward said mold to feed filament into said cavity, for actuating said force rod moving means to force a charge into said mold cavity, for actuating said force rod moving means to move said force rod away from said mold cavity, for actuating said shear plate moving means to shear the filament and for actuating said movable base moving means thereafter to move said movable base toward said mold to feed filament into said cavity and thus remove the molded product from said mold cavity.

9. A molding machine comprising a mold having two oppositely facing outer surfaces, said mold having a mold cavity opening upon one outer surface of said mold, a filament guiding passage in said mold communicating between said cavity and the other outer surface of said mold, a shear plate adjacent the other outer surface of said mold and having a filament guiding passage therethrough normally in registry with said first mentioned passage, means for moving and returning said shear plate with relation to said mold and in a plane parallel to the other outer surface of said mold for shearing, adjacent the other outer surface of said mold, a filament extending through said passages, a movable base having a slot therein which has mutually facing, tapering walls, a gripper element received in said slot, spring means carried by said movable base and yieldably urging said gripper element into a wedging relationship with the tapering walls of said slot, a fixed base having a slot therein which has mutually facing, tapering walls, the slot of said fixed base being aligned longitudinally with the slot of said movable base, the walls of said fixed base tapering in the same direction as the walls of said movable base, a gripper element received in said fixed base slot, spring means carried by said fixed base and yieldably urging the gripper element of said fixed base into a wedging relationship with the walls of said fixed base slot, means for moving said movable base in opposite directions which are generally parallel to the lengths of said slots, said slots being aligned longitudinally with said passage in said mold so as to provide a straight path for a filament, a ram having a ram face and having a charge-receiving chamber in said ram opening upon said ram face, a force rod reciprocably received in said chamber, means for moving said force rod toward said mold cavity to a first position adjacent said mold cavity for forcing a charge from said chamber into said mold cavity, said force rod moving means also acting to move said force rod away from said mold cavity to a second position removed from said mold cavity, spring means connecting said ram and said force rod for causing said ram to move with said force rod toward said mold until said ram face engages said one mold surface in registry with said mold cavity, said ram face being proportioned to overlap said mold cavity, a first probe, a second probe, means carrying said first and second probes, said force rod moving means being operable, when moving said force rod to said second position, to actuate said carrying means to move said first probe into said cavity and said second probe toward said ram face, means, actuated by said first probe when said first probe encounters a molded product in said mold cavity, for preventing operation of said force rod moving means, means, actuated by engagement of said second probe with a molded product adhering to the face of said ram, for preventing operation of said moving means, a pellet conveying tube having a lower end fixed in a generally vertical attitude, a pivotally mounted element having a tubular portion, said tubular portion having an opening in the wall thereof, and a fixed stop projecting generally horizontally below said tube end at a spaced distance therefrom, said pivotally mounted element being pivotal between a first location in which said tubular portion is generally vertical and is aligned with and adjacent to said lower end of said tube and said stop is projecting through said opening and into the interior of said tubular portion for stopping the passage of pellets through said tubular portion and a second location in which said tubular portion is generally vertical and said stop is no longer projecting through said opening for allowing pellets in said tubular portion to pass downwardly therethrough, a rod connected to said pivotally mounted element, a collar fixed to said rod, spring means engaging said collar for yieldably urging said pivotally mounted element into said first location, said force rod moving means also being arranged to engage said collar to move said pivotally mounted element into said second location when said force rod moving means is moving said force rod to said second position, and control means for actuating said movable base moving means to move said movable base toward said mold to feed filament into said cavity, for actuating said force rod moving means to force a charge into said mold cavity, for actuating said force rod moving means to move said force rod away from said mold cavity, for actuating said shear plate moving means to shear the filament and for actuating said movable base moving means to move said movable base toward said mold to feed filament into said cavity and thus remove a molded product from said mold cavity.

10. A molding machine comprising a mold having a mold cavity opening upon an outer surface of said mold, a ram having a charge-receiving chamber opening upon an end face of said ram and having a port opening from another face of said ram to said chamber, a force rod reciprocably received in said chamber, means for moving said force rod toward said mold cavity to a first position adjacent said mold cavity for forcing a charge from said chamber into said mold cavity, said moving means also acting to move said force rod away from said mold cavity to a second position removed from said mold cavity, spring means connecting said ram and said force rod for causing said ram to move with said force rod toward said mold until said ram end face engages said mold surface in an overlapping relationship to said mold cavity, a pellet supply tube having a lower end fixed in a generally vertical attitude, a pivotally mounted carrier, a pellet delivery tube supported to move with said carrier with its upper open end arranged to be moved, by said carrier, into and out of registry with said supply tube lower end and its lower open end arranged to be moved, by said carrier, out of and into registry with said ram port, said delivery tube having an opening in a lateral wall thereof, a stop mounted adjacent said tube wall and proportioned and arranged to enter said delivery tube through said opening when said carrier is moved to bring the upper end of said delivery tube into registry with the lower end of said supply tube and the lower end of said delivery tube out of registry with said ram port to prevent pellet movement therepast through said delivery tube, and to be withdrawn from said delivery tube when said carrier is moved to bring the lower end of said delivery tube into registry with said ram port and the upper end of said delivery tube out of registry with the lower end of said supply tube to permit pellet delivery to said charge-receiving chamber, a rod operatively connected to said carrier, a collar fixed to said rod, and spring means engaging said collar and yieldably urging said carrier toward a position in which said tube ends are in registry, said force rod moving means also being arranged to engage said collar, as said force rod moving means moves said force rod to said second position, to move said carrier to a position in which the lower end of said delivery tube registers with said ram port.

11. A molding machine comprising a mold having a mold cavity opening through a first face thereof, a ram mounted for movement toward and away from said first mold face and proportioned and arranged, when in engagement with said first mold face, to close said mold cavity, said ram being formed to provide a charge-receiving chamber communicating, when said ram engages said first mold face, with said cavity, a force rod in said chamber and coaxially reciprocable therein, means limiting the path of reciprocation of said rod relative to said ram, said mold being formed with a passage opening from said cavity through a second face of said mold opposite said first mold face, filament-advancing means mounted adjacent said second mold face and constructed and arranged to advance a filament through said passage into said cavity in a direction parallel with the line of movement of said ram, power means acting on said force rod to move the same toward said mold to deliver a charge from said chamber into said cavity, spring means providing a resilient, lost-motion driving connection between said power means and said ram to move said ram into engagement with said first mold face before charge-delivering movement of said force rod relative to said ram, means actuated by retractive movement of said force rod to shear said filament adjacent said second mold face, and means actuated by retractive movement of said ram to energize said filament-advancing means.

12. A molding machine comprising a mold having a mold cavity opening through a first face thereof, a ram mounted for movement toward and away from said first mold face and having a forward face engageable with said first mold face and proportioned and arranged, when in engagement with said first mold face, to close said mold cavity, said ram being formed to provide a charge-receiving chamber communicating, when said ram engages said first mold face, with said cavity, a force rod in said chamber and coaxially reciprocable therein, means limiting the path of reciprocation of said rod relative to said ram, said mold being formed with a passage opening from said cavity through a second face of said mold opposite said first mold face, filament-advancing means mounted adjacent said second mold face and constructed and arranged to advance a filament through said passage into and beyond said cavity in a direction parallel with the line of movement of said ram, said ram face being formed with a socket axially aligned with said passage and adapted to receive that portion of said filament which extends beyond said cavity, power means acting on said force rod to move the same toward said mold to deliver a charge from said chamber into said cavity, spring means providing a resilient, lost-motion driving connection between said power means and said ram to move said ram into engagement with said first mold face before charge-delivering movement of said force rod relative to said ram, means actuated by retractive movement of said force rod to shear said filament adjacent said second mold face, and means actuated by retractive movement of said ram to energize said filament-advancing means.

13. A molding machine comprising a mold having a mold cavity opening through a first face thereof, a ram mounted for movement toward and away from said first mold face and proportioned and arranged, when in engagement with said first mold face, to close said mold cavity, said ram being formed to provide a charge-receiving chamber communicating, when said ram engages said first mold face, with said cavity, a force rod in said chamber and coaxially reciprocable therein, mean limiting the path of reciprocation of said rod relative to said ram, said mold being formed with a passage opening from said cavity through a second face of said mold opposite said first mold face, filament-advancing means mounted adjacent said second mold face and constructed and arranged to advance a filament through said passage into said cavity in a direction parallel with the line of movement of said ram, power means operatively connected to said ram to advance the same into such engagement with said first mold face and operatively connected to said force rod to advance the same thereafter relative to said ram to deliver a charge from said chamber into said cavity, means actuated by retractive movement of said force rod to shear said filament adjacent said second mold face, and means actuated by retractive movement of said ram to energize said filament-advancing means.

14. The machine of claim 12 in which said filament-shearing means includes an element bearing against said second mold face, mounted for rotational movement about an axis parallel with the line of movement of said ram, and formed with a bore therethrough offset from said axis and registrable, at times, with said mold passage, said filament-advancing means being constructed and arranged to advance such a filament through said bore on its way to said mold passage, said means actuated by retractive movement of said force rod acting to turn said element to move said bore out of registry with said mold passage and then to return said bore into such registry before energization of said filament-advancing means.

15. The machine of claim 11 including a material reservoir, a charge-measuring device, means actuated by advancing movement of said force rod to deliver a charge of material from said reservoir to said charge-measuring device, and means actuated by retractive movement of said force rod to deliver such a charge from said charge-measuring device to said charge-receiving chamber.

References Cited in the file of this patent

UNITED STATES PATENTS

| | | |
|---|---|---|
| 445,344 | Hartsuff | Jan. 27, 1891 |
| 1,639,295 | Jesnig | Aug. 16, 1927 |
| 1,639,296 | Jesnig | Aug. 16, 1927 |
| 2,275,269 | O'Loughlin | Mar. 3, 1942 |
| 2,341,991 | Jackson | Feb. 15, 1944 |
| 2,444,339 | Dinzl | June 29, 1948 |
| 2,568,771 | Smith | Sept. 25, 1951 |
| 2,584,534 | Barnhardtson | Feb. 5, 1952 |
| 2,698,681 | Wright et al. | Jan. 4, 1955 |
| 2,794,211 | Brown et al. | June 4, 1957 |
| 2,900,662 | Scherry | Aug. 25, 1959 |

FOREIGN PATENTS

| | | |
|---|---|---|
| 149,609 | Australia | Nov. 22, 1951 |
| 99,007 | Sweden | May 28, 1940 |